United States Patent
Takeuchi et al.

(10) Patent No.: US 12,283,292 B2
(45) Date of Patent: Apr. 22, 2025

(54) HARD DISK DRIVE IDLE SWEEP FOR THERMAL ASPERITY AVOIDANCE

(71) Applicant: Western Digital Technologies, Inc., San Jose, CA (US)

(72) Inventors: Shuntaro Takeuchi, Fujisawa (JP); Masaki Otsuka, Odawara (JP); Toshiya Shiramatsu, Ebina (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/229,144

(22) Filed: Aug. 1, 2023

(65) Prior Publication Data
US 2024/0428829 A1    Dec. 26, 2024

Related U.S. Application Data

(60) Provisional application No. 63/523,073, filed on Jun. 24, 2023.

(51) Int. Cl.
   *G11B 33/14*     (2006.01)
   *G11B 5/60*      (2006.01)
   *G11B 25/04*     (2006.01)

(52) U.S. Cl.
   CPC ........ *G11B 33/1406* (2013.01); *G11B 5/6029* (2013.01); *G11B 25/043* (2013.01); *G11B 2220/2516* (2013.01)

(58) Field of Classification Search
   None
   See application file for complete search history.

(56) References Cited

U.S. PATENT DOCUMENTS

| | | | |
|---|---|---|---|
| 6,760,174 B2 | 7/2004 | Forehand | |
| 6,930,849 B2 * | 8/2005 | Tokizono | G11B 5/5521 360/75 |

(Continued)

OTHER PUBLICATIONS

Srivastava, Abhishek et al., Ranking of Thermal Asperity (TA) Interaction During Seeking Under Various Fly-Height Conditions, ASME Digital Collection, Sep. 10, 2020, 2 pages, Paper No. ISPS2020-1962, V001T01A003, https://doi.org/10.1115/ISPS2020-1962, ASME.

(Continued)

*Primary Examiner* — Fred Tzeng
(74) *Attorney, Agent, or Firm* — John D. Henkhaus

(57) ABSTRACT

An idle sweep routine for a hard disk drive involves a series of servo-controlled one-Nth (1/N) equivalent sub-band random seeks in one radial direction, followed by another series of servo-controlled one-Nth equivalent sub-band random seeks in the other radial direction, where a complete band refers to the complete set of user-data tracks and a one-Nth sub-band refers to a contiguous 1/N portion of the complete band. For example, a first series of ⅕ sub-band random seeks may be in the disk outer diameter (OD) to inner diameter (ID) direction, followed by a second set of ⅕ sub-band random seeks in the ID to OD direction. Based on disk scratch and Si smear robustness, ⅕ sub-band random seeks are found effective in moving the sider over a significant number of tracks during each seek to likely inhibit disk lubrication degradation and avoid thermal asperities during such an idle sweep routine.

20 Claims, 3 Drawing Sheets

(56) References Cited

U.S. PATENT DOCUMENTS

| | | | |
|---|---|---|---|
| 6,985,998 B2 * | 1/2006 | Higashijima | G11B 21/083 |
| | | | 711/100 |
| 7,153,192 B1 | 12/2006 | Kurita et al. | |
| 7,583,467 B2 | 9/2009 | Lee | |
| 8,694,841 B1 | 4/2014 | Chung et al. | |
| 9,852,754 B1 * | 12/2017 | Martin | G11B 5/5547 |
| 10,388,314 B1 | 8/2019 | Liu et al. | |
| 2003/0053242 A1 | 3/2003 | Forehand | |

OTHER PUBLICATIONS

Srivastava, Abhishek et al., Head-disk interface (HDI) degradation risk reduction in hard disk drive (HDD) during thermal asperity (TA) track follow mapping and seeking, Microsystem Technologies, Accepted: Dec. 4, 2020 / Published online Jan. 3, 2021, 6 pages, https://doi.org/10.1007/s00542-020-05170-4, Springer.

* cited by examiner

HARD DISK DRIVE IDLE SWEEP FOR THERMAL ASPERITY AVOIDANCE

FIELD OF EMBODIMENTS

Embodiments of the invention may relate generally to data storage devices such as hard disk drives and particularly to approaches for avoiding thermal asperities in a hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

While an HDD is idle, i.e., in an idle state/condition for an extended interval during which no data read-write operations are being performed, it is nevertheless common to move the read-write head(s) over the disk media in sweep cycle operations or routines. There may be a number of goals of such background idle operations, such as to identify media surface defects such as disk asperities, to remove (or "sweep") particulates, contaminants, debris from the surface of the media, or to prevent the transducer from being maintained in a stationary position and thus risk damage due to repeated thermal asperity contact events, lubrication disturbance, wear, and the like. Here, a thermal asperity refers to a class of surface defects on rotating media, characterized by a localized defect on a media surface sufficient in size to alter the thermal equilibrium of the reader thus inducing signal noise, and/or contact the head slider, etc.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

SUMMARY OF EMBODIMENT(S)

Figure 1:
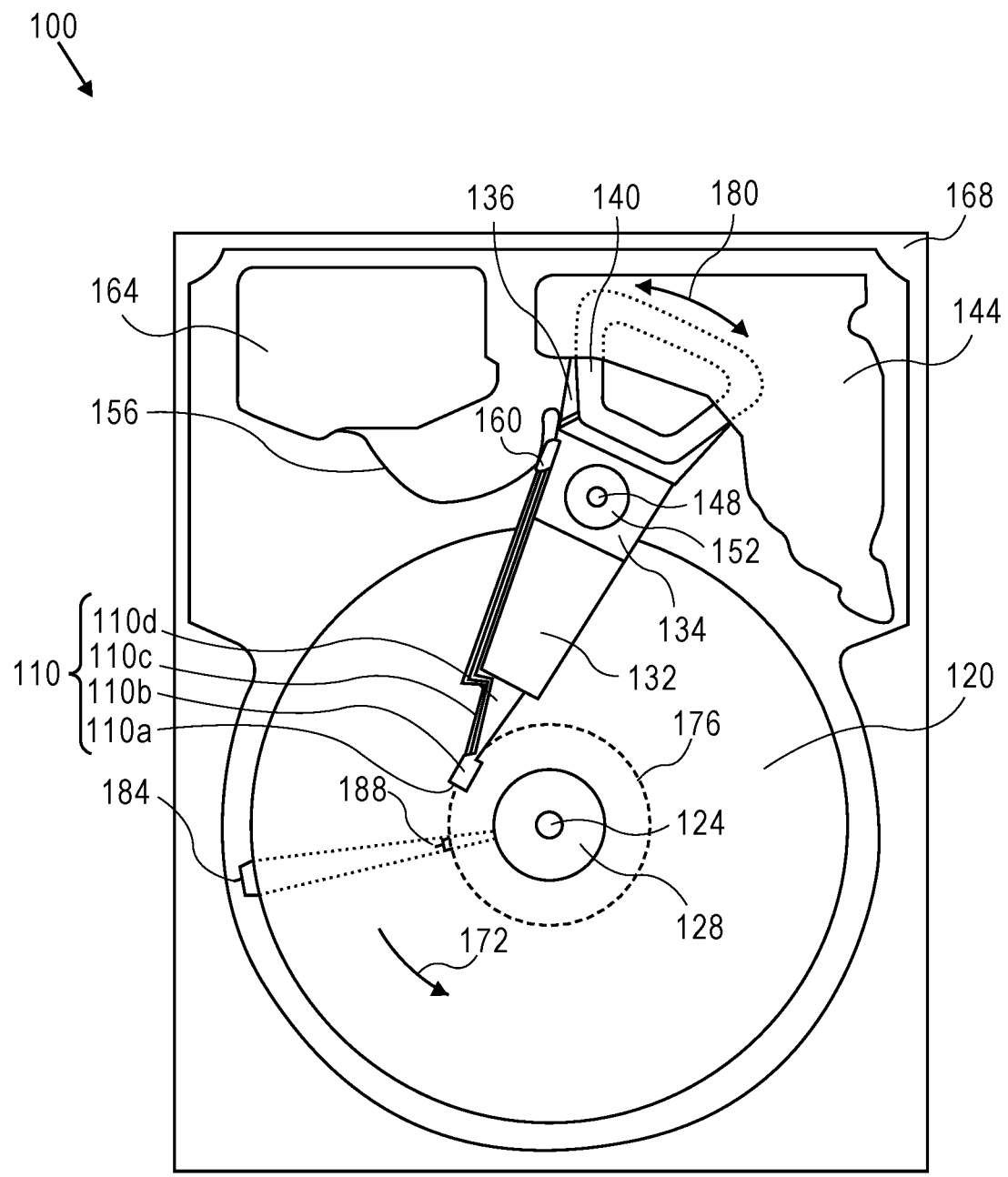
FIG. 1 is a plan view illustrating a hard disk drive (HDD), according to an embodiment.

Controller circuitry for a hard disk drive wherein a band spans the data storage area of a disk medium, the controller circuitry storing or accessing one or more sequences of instructions which, when executed by one or more processors, cause performance of: while in an idle state not performing a data operation, (i) performing a first seek operation from a particular first equivalent sub-band position that a head slider is flying over the disk medium to an adjacent second equivalent sub-band position over the disk medium, and (ii) performing a second seek operation from the second equivalent sub-band position to an adjacent third equivalent sub-band position over the disk medium.

DETAILED DESCRIPTION

Generally, approaches to avoiding thermal asperities in a hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that various idle sweep operations may be employed in hard disk drives (HDDs) for various purposes or with various goals. Common approaches may involve a spiral movement or a serpentine movement to gradually advance the head slider in a selected radial direction across the data recording media surface, possibly at a rate such that the slider effectively moves at single-track intervals (e.g., recording disk media are effectively provisioned in narrow concentric data recording bands, or "tracks"). Some approaches may further involve the use of thermal fly height control (TFC) mechanisms to vary the flying height of the slider for an intended purpose. Thus, one particular form of sweep operation may not be the best approach for all purposes. Furthermore, there is another class of surface defects on rotating media, often referred to as a high thermal asperity (HTA), which is characterized by a localized defect on a media surface whose height exceeds the fly height of the head slider.

There are a number of detrimental effects that may occur within an HDD over time, simply due to operation and the nature of the device components, for example. One detrimental effect involves disk surface scratches associated with particulates, contaminants, debris on the surface of the media and/or head slider, whereby such particulates, etc. may be generated from within the HDD with use thereof. Another detrimental effect involves silicon smear ("Si smear") associated with outgassing from one or more components within the HDD. With Si smear, silicon is adsorbed on the disk lubrication (or simply "lube"), whereby it can be picked up by the head slider. In turn, heat is generated by contact between the disk lube and the Si (e.g., siloxane) on the slider, causing siloxane to change to $SiO_2$. This Si smear in solid form adheres to the slider, causing a rise in fly height change (dFH) (e.g., a lowering of fly height) which is likely to ultimately result in disk damage due to slider-disk contact events. Disk lube degradation leads to Si smear progression and acceleration, which can ultimately lead to a reduced seek range of the afflicted slider due to remedial responses.

Idle Sweep Operation for High Thermal Asperity Avoidance

In view of the foregoing Si smear phenomenon, idle sweep procedures that move the sliders at a rate equating to only about a track at a time may be likely to accelerate the formation of Si smear on a given head slider, such as due to relative dwell time spent flying over and around each disk position (e.g., spiral seek at 0.3 millimeters/second, without servo control) and lubrication degradation associated therewith. Thus, utilization of an idle sweep procedure including a random seek operation with servo control would be expected to be beneficial, such as in the context of disk scratch (particle) avoidance and/or Si smear (outgas) avoidance.

Figure 2:
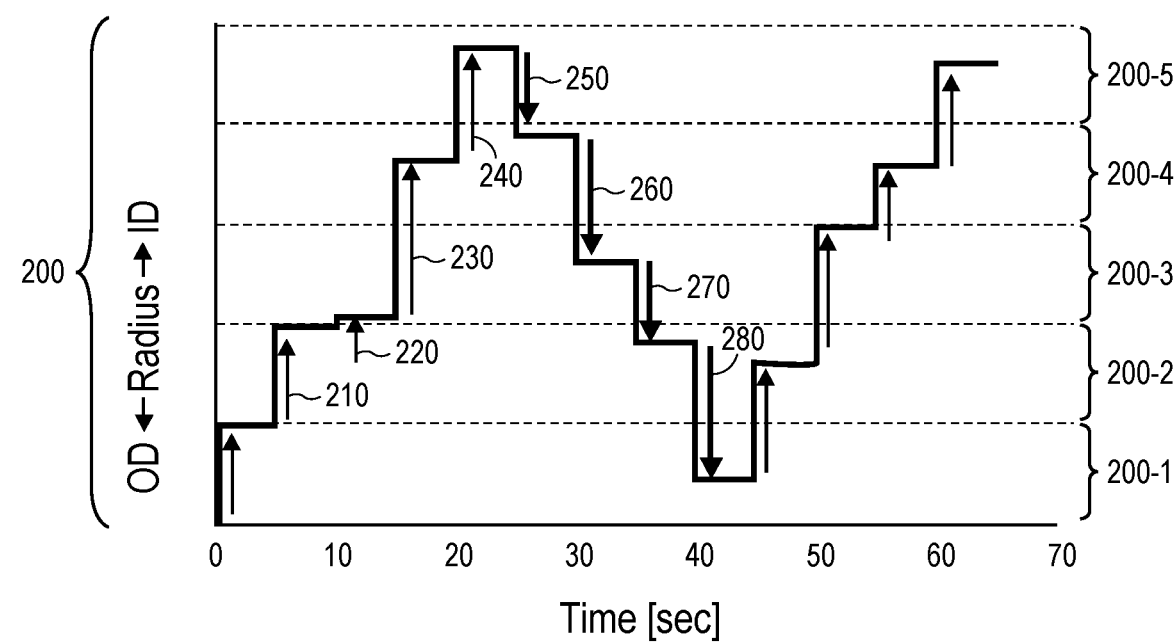
FIG. 2 is a diagram illustrating operation of an idle sweep procedure including random seek operations, according to an embodiment.
Figure 3:
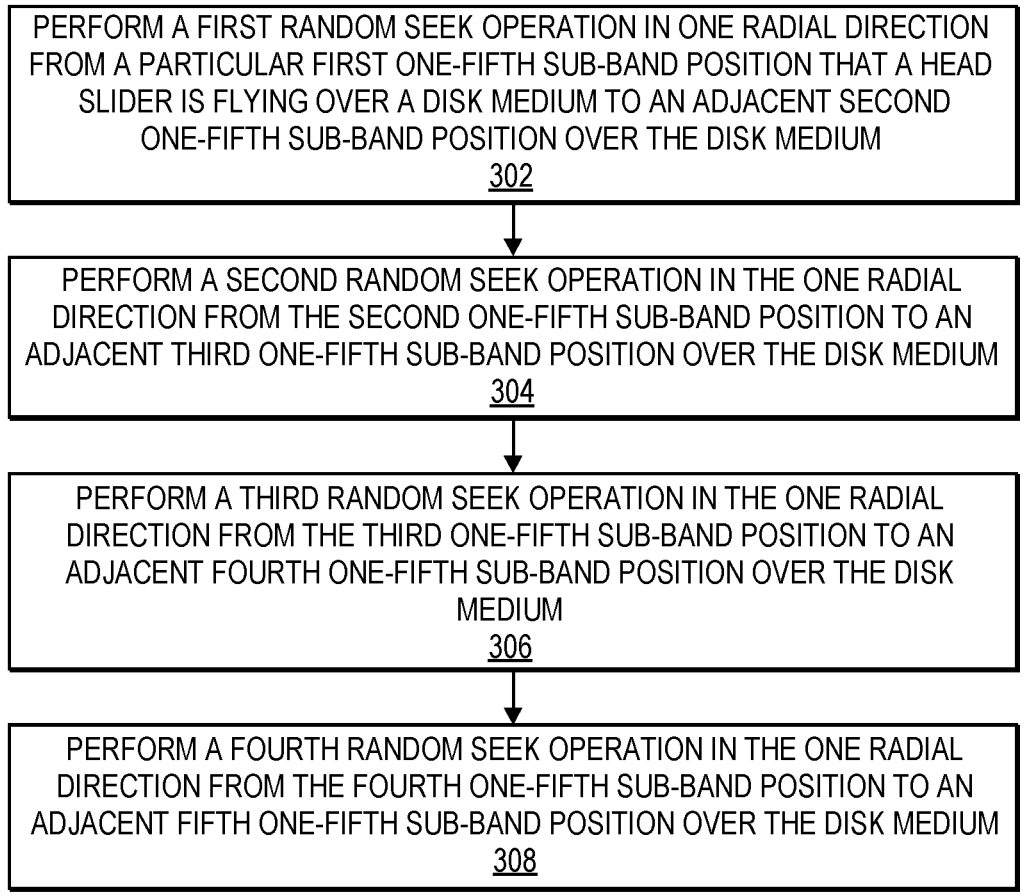
FIG. 3 is a flowchart illustrating a method of avoiding thermal asperities, according to an embodiment.

FIG. 2 is a diagram illustrating operation of an idle sweep procedure including random seek operations, according to an embodiment. FIG. 3 is a flowchart illustrating a method of avoiding thermal asperities, according to an embodiment. The diagram of FIG. 2 is used herein as a non-limiting visual example of an implementation or use of the method of FIG. 3. Processing, functions, procedures, actions, method steps, and the like, that are described herein may include enactment by execution of one or more sequences of one or more instructions stored in one or more memory units and which, when executed by one or more processors, cause such performance. For example, controllers referenced herein (e.g., an electronic controller, controller circuitry) and embodied in any form of and/or combination of software, hardware, and firmware, such as an application-specific integrated circuit (ASIC) comprising at least one memory unit for storing such instructions and at least one processor for executing such instructions, may be configured and implemented for such execution of instructions.

In FIG. 3, the method of avoiding thermal asperities may be implemented in the context of a data storage device such as a hard disk drive (HDD), where a "band" (or "data storage band") is generally described as spanning the data storage area of a disk medium. Particularly, a "band" refers to the user data area of the disk medium in which user data may be recorded or stored, such as the complete set of media data tracks established when the disk medium is low-level formatted. According to an embodiment, the method of FIG. 3 is performed as a background operation, i.e., while the storage device is in an idle state or condition, which refers to a condition in which the device and associated read-write transducer (head) are not actively performing a data operation (e.g., seeking a specific track, reading, writing) but is in a ready state awaiting a host data command. Thus this method may colloquially be considered and referred to as an "idle sweep".

At block 302, perform a first seek operation from a particular first one-fifth sub-band position that a head slider is flying over the disk medium to an adjacent second one-fifth sub-band position over the disk medium. As described elsewhere, a complete band refers to the complete set of user-data tracks so, here, a "one-fifth sub-band" refers to a contiguous one-fifth (⅕) portion of the complete band. Thus, the full band 200 (FIG. 2) is logically segmented into five (5) one-fifth sub-bands, 200-1 through 200-5 (FIG. 2). For example, at block 302, seek 210 (FIG. 2) is performed (e.g., caused by a controller to perform) to move the head slider from within a first ⅕ sub-band 200-1 to a second ⅕ sub-band 200-2.

At block 304, perform a second seek operation from the second one-fifth sub-band position to an adjacent third one-fifth sub-band position over the disk medium. For example, seek 220 (FIG. 2) is performed (e.g., caused by a controller to perform) to move the head slider from the second ⅕ sub-band 200-2 to a third ⅕ sub-band 200-3.

According to an embodiment, the first and second seeks are random seek operations and therefore under the control of an HDD servo controller or electronics referred to in reference to FIG. 1, rather than a movement rate-based idle sweep (e.g., 0.3 mm/sec).

At block 306, perform a third random seek operation from the third one-fifth sub-band position to an adjacent fourth one-fifth sub-band position over the disk medium. For example, seek 230 (FIG. 2) is performed (e.g., caused by a controller to perform) to move the head slider from the third ⅕ sub-band 200-3 to a fourth ⅕ sub-band 200-4.

At block 308, perform a fourth random seek operation from the fourth one-fifth sub-band position to an adjacent fifth one-fifth sub-band position over the disk medium. For example, seek 240 (FIG. 2) is performed (e.g., caused by a controller to perform) to move the head slider from the fourth ⅕ sub-band 200-4 to a fifth and final ⅕ sub-band 200-5.

According to an embodiment, the first through fourth seeks 210-240 (at blocks 302-308) are each random seek operations and therefore under the control of an HDD servo controller or electronics referred to in reference to FIG. 1, rather than a host-commanded seek and rather than a movement rate-based idle sweep (e.g., 0.3 mm/sec). According to another embodiment, each of the first through fourth seeks 210-240 are performed in substantially 5-second intervals, as depicted in FIG. 2. According to yet another embodiment, each of the first through fourth seeks 210-240 (at blocks 302-308) includes moving the head slider in the same radial direction, such as from the outer diameter (OD) toward the inner diameter (ID) of the disk medium, as depicted by example in FIG. 2. Similarly, each of the first through fourth seeks may include moving the head slider from the ID toward the OD, as long as these successive random seeks move from sub-band to adjacent sub-band all in the same direction. The manner in which the full band is divided into sub-bands for these random seek operations may vary from implementation to implementation and, therefore, the sub-bands may be less than ⅕ sub-bands or more than ⅕ sub-bands and still fall within the scope of the claimed embodiments. For a non-limiting example, implementation and use of at least more than two equivalent sub-bands (e.g., equivalent radial width and/or number of tracks), such as ⅓ (one-third) sub-bands or 1/N sub-bands where N is a number greater than two, is generally considered an effective approach to an HTA-avoiding idle seek operation. However, ⅕ sub-bands are found effective and preferred for the intended purpose(s), such as to move over a significant number of tracks during each seek operation to more likely inhibit disk lubrication degradation and avoid high thermal asperities (HTAs) during such an idle sweep routine.

Continuing with the foregoing idle sweep routine and according to an embodiment, a fifth random seek operation 250 (FIG. 2) is performed moving the head slider from the fifth ⅕ sub-band 200-5 position back to the fourth ⅕ sub-band 200-4 in a second radial direction opposing the first radial direction, e.g., from the disk ID to the OD, as depicted by example in FIG. 2. Next, a sixth random seek operation 260 (FIG. 2) is performed moving the head slider from the fourth ⅕ sub-band 200-4 position back to the third ⅕ sub-band 200-3 in the second radial direction. Next, a seventh random seek operation 270 (FIG. 2) is performed moving the head slider from the third ⅕ sub-band 200-3 position back to the second ⅕ sub-band 200-2 in the second radial direction and, then, an eighth random seek operation 280 (FIG. 2) is performed moving the head slider from the second ⅕ sub-band 200-2 position back to the first ⅕ sub-band 200-1 in the second radial direction. As depicted in FIG. 2, the foregoing routine of successive random seeks along ⅕ sub-bands of the media may then be repeated while the device remains in idle condition.

In a comparative study of the foregoing idle sweep routine, a known spiral seek at 0.3 mm/sec in one radial direction in conjunction with an occasional full band seek in the other radial direction, and a fully random series of seek operations in both directions at 5 second intervals, both disk scratch robustness (e.g., based on scratch count) and outgas/Si smear robustness (e.g., based on increased TTF or "time to failure") were comparable or better with the sweep routine of the described embodiments, along with the expectation of desirably avoiding HTAs and consequent component damage.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD and likewise a multi-actuator HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120, but commonly multiple recording media 120, rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations. The HSA is configured to mechanically interact with a load/unload (LUL) ramp 190 to move the head stack assembly (HSA), including the read-write head sliders, away from and off the disks and to safely position them onto the supporting structure of the LUL ramp.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method of avoiding thermal asperities in a hard disk drive wherein a band spans the data storage area of a disk medium, the method comprising:
    while in an idle state not performing a data operation,
        performing a first seek operation from a particular first one-fifth sub-band position that a head slider is flying over the disk medium to an adjacent second one-fifth sub-band position over the disk medium; and
        performing a second seek operation from the second one-fifth sub-band position to an adjacent third one-fifth sub-band position over the disk medium.

2. The method of claim 1, wherein performing each of the first and the second seek operations includes performing a random seek operation.

3. The method of claim 1, wherein performing each of the first and the second seek operations includes performing a random seek operation, the method further comprising:
    while still in the idle state,
        performing a third random seek operation from the third one-fifth sub-band position to an adjacent fourth one-fifth sub-band position over the disk medium; and
        performing a fourth random seek operation from the fourth one-fifth sub-band position to an adjacent fifth one-fifth sub-band position over the disk medium.

4. The method of claim 3, wherein performing each of the first through the fourth seek operations includes moving the head slider in the same radial direction.

5. The method of claim 3, wherein performing each of the first through the fourth seek operations includes moving the head slider in the same first radial direction, the method further comprising:
  performing a fifth random seek operation from the fifth one-fifth sub-band position to the fourth one-fifth sub-band position in a second radial direction opposing the first radial direction;
  performing a sixth random seek operation from the fourth one-fifth sub-band position to the third one-fifth sub-band position in the second radial direction;
  performing a seventh random seek operation from the third one-fifth sub-band position to the second one-fifth sub-band position in the second radial direction; and
  performing an eighth random seek operation from the second one-fifth sub-band position to the first one-fifth sub-band position in the second radial direction.

6. The method of claim 5, wherein:
  the first radial direction is in the direction from the outer diameter (OD) of the disk medium toward the inner diameter (ID) of the disk medium; and
  the second radial direction is in the direction from the ID toward the OD.

7. The method of claim 1, wherein performing each of the first and the second seek operations includes performing a random seek operation, the method further comprising:
  while in the idle state and prior to performing the first and second seek operations, performing an initial random seek operation from an inner diameter or outer diameter position to the adjacent first one-fifth sub-band position over the disk medium.

8. A controller circuitry for a hard disk drive wherein a band spans the data storage area of a disk medium, the controller circuitry storing or accessing one or more sequences of instructions which, when executed by one or more processors, cause performance of:
  while in an idle state not performing a data operation,
    performing a first seek operation from a particular first equivalent sub-band position that a head slider is flying over the disk medium to an adjacent second equivalent sub-band position over the disk medium; and
    performing a second seek operation from the second equivalent sub-band position to an adjacent third equivalent sub-band position over the disk medium.

9. The controller circuitry of claim 8, wherein causing performance of each of the first and the second seek operations includes causing performance of a random seek operation.

10. The controller circuitry of claim 8, wherein the equivalent sub-bands comprise greater than two equivalent sub-bands for the data storage area of the disk medium in which user data may be stored.

11. The controller circuitry of claim 10, wherein causing performance of each of the first and the second seek operations includes causing performance of moving the head slider in the same first radial direction, and wherein the one or more sequences of instructions which, when executed by one or more processors, cause further performance of:
  performing a third random seek operation from the third equivalent sub-band position to the second equivalent sub-band position in a second radial direction opposing the first radial direction; and
  performing a fourth random seek operation from the second equivalent sub-band position to the first equivalent sub-band position in the second radial direction.

12. The controller circuitry of claim 11, wherein:
  the first radial direction is in the direction from the outer diameter (OD) of the disk medium toward the inner diameter (ID) of the disk medium; and
  the second radial direction is in the direction from the ID toward the OD.

13. The controller circuitry of claim 11, wherein causing performance of the first through the fourth random seek operations includes causing performance of each random seek operation at a 5-second interval.

14. The controller circuitry of claim 8, wherein causing performance of each of the first and the second seek operations includes causing performance of moving the head slider in the same radial direction.

15. A hard disk drive comprising the controller circuitry of claim 8.

16. A hard disk drive (HDD) comprising:
  a disk medium rotatably mounted on a spindle, wherein a band spans the data storage area of the disk medium;
  a head slider housing a read-write transducer configured to read from and to write to the disk medium;
  means for moving the head slider to access portions of the disk medium; and
  an electronic controller configured to control the means for moving, the controller configured for causing performance of:
    while in an idle state not performing a data operation,
      performing a first seek operation from a particular first equivalent sub-band position that a head slider is flying over the disk medium to an adjacent second equivalent sub-band position over the disk medium, and
      performing a second seek operation, in a same first radial direction as the first seek operation, from the second equivalent sub-band position to an adjacent third equivalent sub-band position over the disk medium.

17. The HDD of claim 16, wherein the controller causing performance of each of the first and the second seek operations includes causing performance of a random seek operation.

18. The HDD of claim 16, wherein the equivalent sub-bands comprise greater than two equivalent sub-bands for the data storage area of the disk medium in which user data may be stored.

19. The HDD of claim 16, wherein the controller is configured for causing further performance of:
  performing a third random seek operation from the third equivalent sub-band position to the second equivalent sub-band position in a second radial direction opposing the first radial direction; and
  performing a fourth random seek operation from the second equivalent sub-band position to the first equivalent sub-band position in the second radial direction.

20. The HDD of claim 19, wherein:
  the first radial direction is in the direction from the outer diameter (OD) of the disk medium toward the inner diameter (ID) of the disk medium; and
  the second radial direction is in the direction from the ID toward the OD.

* * * * *